July 27, 1943.  A. F. ALLWEIN ET AL  2,325,091
PRESSURE MEASURING INSTRUMENT
Filed Oct. 17, 1941
FIG. I.
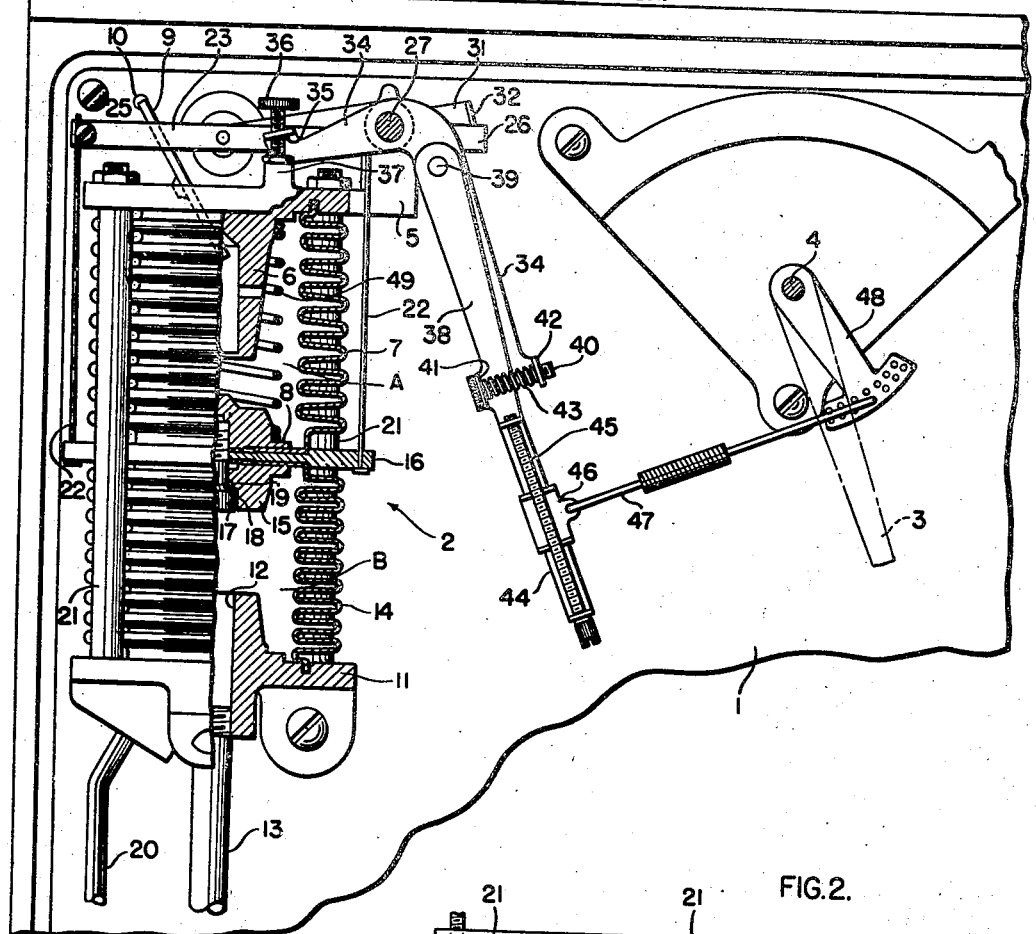
FIG. 2.
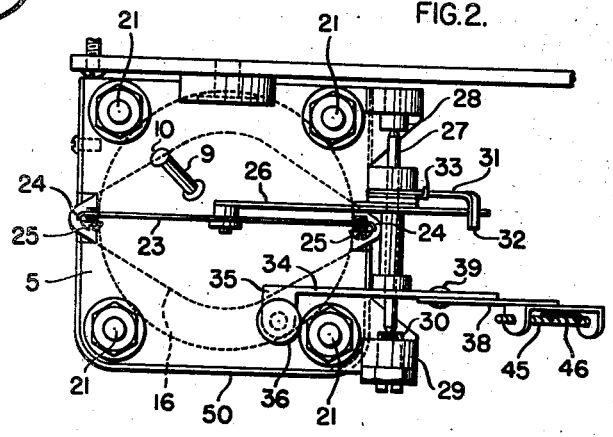
INVENTOR.
ALOYSIUS F. ALLWEIN
EDWIN C. BURDICK
BY C. B. Spangenburg
ATTORNEY Patented July 27, 1943

2,325,091

UNITED STATES PATENT OFFICE 2,325,091

PRESSURE MEASURING INSTRUMENT

Aloysius F. Allwein and Edwin C. Burdick, Philadelphia, Pa., assignors to The Brown Instrument Company, Philadelphia, Pa., a corporation of Pennsylvania Application October 17, 1941, Serial No. 415,372

8 Claims. (Cl. 73—110)

The present invention relates to pressure gauges and more particularly to that type of pressure gauge which is used to measure pressures that are below or slightly above atmospheric pressure and are commonly known as absolute pressure gauges.

In the past a great deal of difficulty has been experienced in obtaining a pressure responsive element that was sensitive enough to record minute variations in pressure and at the same time be strong and rigid enough to withstand the forces produced by an absolute vacuum. It has also been a problem to accurately calibrate an instrument of this type and to transfer the movements of the pressure responsive element to a recording element whereby a very small movement of the former can move the latter through a comparatively large distance.

It is accordingly an object of the present invention to provide an absolute pressure gauge that is rugged and accurate and one which may easily be calibrated.

It is a further object of the invention to provide in a measuring instrument a linkage between the pressure responsive element and an indicating element which is easily adjustable to properly calibrate the instrument and which may be adjusted to compensate for individual differences between various pressure responsive elements. It is a further object of the invention to devise a connecting link to be used in a measuring instrument that is compact and may be used in a small space.

A further object of the invention is to provide a novel way to join two expansible chambers together.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

Of the drawing:

Fig. 1 is a front view, partly in section, of a measuring instrument embodying my invention, and Fig. 2 is a top view of the pressure responsive element and connecting linkage.

Referring to the drawing, there is shown in Fig. 1 a casing 1 having a pressure responsive unit 2 supported against its back wall, which unit is used to adjust an exhibiting element 3 through a suitable connecting linkage. This exhibiting element is attached to a shaft 4 which is mounted in bearings in the instrument casing.

The pressure responsive unit consists of an evacuated chamber A which is formed by a rigid support 5 that is fastened to the casing rear wall. This support has a projection 6 extending downwardly therefrom and is provided with a spring seat formed by the corner between the support 5 and the beginning of the projection. The chamber is completed by means of a bellows 7, whose open end is placed in a groove formed in the support 5 and which is soldered thereto. Before the bellows is soldered to the support, a reinforcing member 8, also having a spring seat formed on it, is soldered or otherwise suitably connected to the interior of the bellows at the center of its end wall. When this assembly is made the bellows is evacuated through a tube 9 to as near a complete vacuum as possible and is then sealed off by means of a drop of solder 10.

A second chamber B, which is subjected to the pressures to be measured, is formed by stationary support 11 that has an opening 12 in it, which opening is connected with the pressure source by means of a tube 13. Fastened to this support 11 is a second bellows 14 whose open end is placed in a groove in the support 11 and soldered in position. Before the bellows is soldered to the support, however, a cylindrical reinforcing member 15 is attached to its end wall in a manner similar to that in which the member 8 is fastened to the bellows 7.

A plate 16 is placed between the two bellows end walls and is fastened in position by means of a screw 17 which is inserted through the opening 12 and the reinforcing member 15 and then threaded into the reinforcing member 8. When this screw is tightened it will connect the two bellows end walls and the plate 16 for movement together. It will be noted that the reinforcing member 8 does not have an opening completely through it. This is for the reason that in order to obtain and keep a complete vacuum in the upper chamber no more openings than absolutely necessary should be made therein. In the lower chamber, however, the connection formed by the screw 17 is sufficient to maintain the pressure since the tube 13 is continually connected to the pressure source. The screw, however, is formed with an inclined surface 18 that is tightly forced against the edge 19 of the reinforcing member 15. This serves to make a pressure tight connection between the screw and the reinforcing member so that there will be no pressure leakage in the lower chamber. A drain tube 20 is inserted through the supporting member 11 at the lowest point of the chamber B so that any condensate which might form in the chamber can be drained therefrom in order to keep the chamber its original size. The tube 20 can be provided with a suitable valve that may be opened when the draining is to take place or may be connected to the pressure source. In order to make the pressure responsive unit more rigid and to prevent any possible movement of the supporting members 5 and 11 toward each other four reinforcing rods 21 are used. One of these rods is in each corner of the supporting members 5 and 11 as is best shown in Figure 2. In view of the fact that the upper chamber A is evacuated while the lower chamber B is subjected to the pressure to be measured, any change in pressure in the lower chamber will cause a movement of the plate 16.

Movement of the plate 16 is proportional to the pressure being measured and is transferred to the exhibiting element 3 by means of a linkage comprising wires 22 that are fastened to the plate 16. These wires are fairly stiff and are connected at their upper ends by means of a cross-member 23 whose ends are bent over as shown at 24 in Fig. 2. Screws 25 are then threaded into the cross-member and the heads of these screws cooperating with the bent over ends 24, grasp the wires 22 and hold them rigidly in place. After the wires have been adjusted to their proper length a drop of solder may be placed thereon to prevent any movement thereof.

A lever member 26 that is pivoted to a shaft 27 has its left end pivotally attached to the center portion of the cross member 23 so that as 23 moves up and down the lever will be moved around its pivot. The pivot for the lever is formed by means of a shaft 27 that is journalled in bearings 28 and 29 which form a part of the upper supporting member 5. The bearing 29 is provided with a screw member 30 that has a socket to receive the front end of the shaft 27 and which can be adjusted to vary the end play of this shaft and the freedom with which it moves. It is noted that as the lever 26 turns around its shaft the wires 22 will bend slightly to the right or left to compensate for the angular movement of the lever. This does away with the necessity of a link between 23 and 26 with a consequent reduction in the space necessary for the linkage. Attached to the shaft 27 by a sleeve is a lever 31 which has a bent over end 32 that is held in engagement with the upper surface of the right end of lever 26 by means of a spring 33. This causes the arm 31 and shaft 27 to follow movements of the plate 16 and also serves to keep the wires 22 under tension so that there will be no play in the lever system. Also attached to the shaft 27 is an angularly shaped lever 34 whose left end has a turned over portion 35. An adjusting screw 36 is threaded through this end portion and abuts against a stop 37 formed on the support 5. By adjusting the screw 36 the movement of the lever 34 in a counterclockwise direction can be limited. This position will be determined by the minimum pressure to which the bellows 14 is to be subjected.

An arm 38 is pivoted at 39 to the downwardly extending portion of the lever 34 and acts as an extension of that lever. This arm can be adjusted with respect to lever 34 by means of a screw 40 that passes through a turned-up edge 41 on the arm and is threaded into a turned-up edge 42 on the lever 34. By rotating the screw 40 the angular position of arm 38 can be adjusted with respect to the arm 34. A spring 43 is placed around the screw 40 in order to hold that screw in its adjusted position and in order to maintain the parts 41 and 42 in their proper relation, depending upon the adjustment of the screw. A yoke member 44 is fastened to the lower end of the arm 38 and has journalled in its up-standing ends a screw 45. This screw serves to position a slider 46, that is also U-shaped in form, and which bears against the yoke with its legs in engagement with the threads of the screw, so that this slider can be moved various distances from the shaft 27 as the screw 45 is rotated. Movement of the lever 34 and arm 38 around the pivot 27 acts to adjust the exhibiting element 3 by means of a connecting link 47 and an arm 48 which is attached to the shaft 4. The arm 48 is provided with a plurality of holes through any one of which the connecting link 47 may extend.

An absolute pressure gauge is used to measure absolute pressure rather than gauge pressure, as is usually the case. Therefore, some means is provided to compensate for the atmosphere. It is for this reason that the two opposed chambers A and B are used. Since the atmosphere is acting on the outside of each of the bellows which form the chambers and which are as near identical as possible, its effect will be cancelled out, and the differential pressure within the chambers will produce movement of the plate 16.

In calibrating an instrument various things have to be taken into account such as total movement of the exhibiting element, the bellows characteristics, their area and the range of the instrument. When the bellows 7 is evacuated it will collapse until the projection 6 and member 8 engage to limit its minimum length. If a vacuum is also applied to the bellows 14 the plate 16 will be moved downwardly to some definite position since, disregarding the difference in the bellows characteristics, one vacuum will balance the other, and the exhibiting element will indicate zero pressure. Since it is ordinarily desirable, however, to have the mid-position of the bellows and plate 16 represent the mid-point on the instrument scale instead of its end some means must be provided to elongate the bellows 7 relative to the bellows 14 when the latter has zero pressure in it. To this end a spring 49 is placed in the bellows 7 with its ends on the spring seats formed on parts 6 and 8. By making the spring of different lengths the zero point of the exhibiting element can be changed.

A second and more important function of the spring 49 is to determine the range of the instrument. Suppose both bellows are evacuated and a small amount of air is allowed to enter bellows 14, the bellows 7 would then be compressed a certain amount. If the force of spring 49 is added to the natural resiliency of the bellows the same amount of air in bellows 14 will produce a smaller compression of bellows 7 and movement of the plate 16. Therefore the strength of spring 49 will determine the amount of travel in plate 16 for a given pressure change in bellows 14. The stiffer the spring, the larger the range of the instrument since a larger pressure change will be required to move plate 16 a given amount.

It is practically impossible to get bellows that have the same area and also the same pressure-length curves. That is each bellows will compress different amounts with the same force applied to it. In most cases, however, the shape of the pressure-length curve is similar for different bellows. For this reason the nuts on the upper ends of supporting rods 21 are adjusted until the bellows 7 and 14 have been compressed to a point that they will be operated through a desirable portion of their curves. The support 11 is so mounted on the casing 1 that it may be adjusted enough to take care of the necessary compression of the bellows.

After the pressure responsive unit has been assembled it is placed in the casing along with the linkage between the unit and the exhibiting element. It is then necessary to calibrate the instrument. First, the right end of link 47 is placed in one of the openings of the arm 48 to obtain the correct angle between these two parts for the range of the instrument and the portion of the bellows pressure-length curve that is to be used.

No matter whether the instrument is an indicator or a recorder the exhibiting element has to have some given zero point and move through a given distance. After the parts 47 and 48 have been connected the screws 25 are loosened and the cross-member 23 is shifted up and down on wires 22. With zero pressures in chamber B the cross-member is moved until the element 3 is approximately at its zero scale position, which, in this case, will be as shown with the element 3 at the right end of its travel. The screws 25 are then tightened and a drop of solder placed over each connection to prevent relative movement of the parts. A final zero adjustment is obtained by rotating screw 40 to vary the angular relation of lever 34 and arm 38.

Due to the different characteristics of different bellows some provision must be made to vary the angular movement of the element 3 for a given full range movement of plate 16. This is obtained by rotating screw 45 to move slider 46 in yoke 44. This adjustment varies the effective length of arm 38 and therefore the movement of element 3 for a given displacement of the plate 16.

For the sake of appearance of the completed instrument it is often desirable to place a cover over the front of the measuring unit. To this end a shield 50, shown only in Figure 2, may be fastened to the supports 5 and 11 extend around the two sides and front of the bellows.

While in accordance with the provisions of the statutes, we have illustrated and described the best form of this invention now known to us, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described our invention, what we claim as new and desire to secure by Letters Patent is:

1. In a measuring instrument, the combination of a pair of expansible chambers mounted with one end of each chamber in a fixed position and the opposite end of each chamber in abutting relation and free to move, a member interposed between said abutting ends and movable therewith, means to rigidly fasten said ends and member together, a pair of stiff, flexible links fastened to spaced points on said member and extending in the same direction beyond the fixed end of one of said chambers, a cross-member attached to the free ends of said links, to move therewith as said member moves, a pivoted lever attached at one end to the center of said cross-member, the arrangement being such that as the lever moves around its pivot the links will flex, an arm biased into engagement with said lever to follow the movements thereof, and an exhibiting element operated by said arm.

2. In a measuring instrument the combination of a pair of expansible chambers mounted end to end with the outer ends of each chamber fixed against movement, a plate member inserted between the adjacent ends of said chambers and movable therewith as the pressure in said chambers changes to change the size of said chambers, an exhibiting element, means to move said exhibiting element in response to movement of said plate including a pair of flexible members each attached at one end to spaced points on said plate and extending beyond the fixed end of one of said chambers, a cross-member attached to the other end of said flexible members, and connections between said cross-member and said exhibiting element.

3. In a measuring instrument, a pair of expansible chambers, each of said chambers comprising a bellows having a closed end wall, means to fasten said end walls together comprising a first reinforcing member attached to the inner end wall of one of said bellows, said end wall and member having an opening formed therein, a second reinforcing member fastened to the inside wall of said second bellows, the second reinforcing member and bellows end wall having an opening extending therethrough with a sharp edge formed inside the opening of said second reinforcing member, a fastening member extending through the opening in the second reinforcing member and into the opening in the first reinforcing member, said fastening member being formed with an inclined face that abuts against said sharp edge in the second reinforcing member to form a pressure tight connection therebetween.

4. In a measuring instrument comprising a pair of expansible chambers each formed of a bellows having an end wall, means to fasten the end walls together comprising reinforcing members fastened to the inside of each end wall and a fastening member extending from the inside of one bellows through its reinforcing member and end wall, through the end wall of the second bellows and into said second reinforcing member, whereby said bellows end walls will move together.

5. An absolute pressure gauge comprising a first evacuated bellows mounted with one end free and one end fixed, a second bellows subjected to a pressure to be measured also having one end fixed and one end free, the bellows being so arranged that their free ends abut each other, a reinforcing member attached to the inside of the bottom of said first bellows and having a threaded opening therein communicating with an opening in the bellows wall, a second reinforcing member attached to the inside of the second bellows, said second reinforcing member and bellows having a hole extending through them, a fastening member extending through the hole in the second reinforcing member and being threaded into the opening in said first reinforcing member, said fastening member and second reinforcing member being so relatively shaped that there is a pressure tight connection between them.

6. In a measuring instrument, the combination of a member movable in response to variations in the value of a condition, an exhibiting element, means to move said element by said member comprising a pair of flexible links attached to said member, a cross-piece adjustably attached to the links, a lever mounted for movement around a pivot, means to move said lever by said cross-piece, an arm pivoted to said lever, means to adjust said arm angularly with respect to said lever, a slidable connection on said arm, a link attached to said connection and operable to move said element.

7. In a measuring instrument, a member movable in response to variations in a condition, an exhibiting element, means to move said element by said member including a pair of flexible links connected at one end to spaced points on said member, a cross-member connected to the other ends of said links to form a parallelogram, a pivoted lever attached at one end to said cross-member, means to bias said lever in a direction to keep said links under tension, and connecting means between said lever and element.

8. In a measuring instrument, a member movable in response to variations in a condition, an exhibiting element and means to connect said element for movement by said member comprising a pair of stiff wire links connected at one end to spaced points on said member, a cross-member adapted to be fastened selectively to one of different points along the length of each of said links to form with the links and member a parallelogram, a pivoted lever connected at one end to the mid-point of said cross-member, an arm acting on the other end of said lever in a direction to maintain said links under tension, and adjustable means to connect said arm to said element.

ALOYSIUS F. ALLWEIN.
EDWIN C. BURDICK.